United States Patent [19]

Willis

[11] 4,312,695
[45] Jan. 26, 1982

[54] METHOD AND APPARATUS FOR EVERTING A CLOSURE AND SEPARATING A LINER THEREFROM

[75] Inventor: W. Coy Willis, Hagerstown, Ind.

[73] Assignee: Aluminum Company of America, Pittsburgh, Pa.

[21] Appl. No.: 143,743

[22] Filed: Apr. 25, 1980

[51] Int. Cl.³ .............................. B32B 31/18
[52] U.S. Cl. .................... 156/344; 29/426.4; 29/426.5; 53/76; 53/381 A; 53/492; 72/347; 72/354; 81/3.1 B; 81/3.2; 156/499; 156/581; 156/584; 215/301; 215/303
[58] Field of Search .............. 29/426.4, 426.5; 53/76, 53/381 A, 492; 72/347, 354; 81/3.1 B, 3.1 R, 3.2; 113/1 K, 1 F; 156/344, 584; 220/DIG. 22; 156/499, 581; 215/295, 301, 302, 303

[56] References Cited

U.S. PATENT DOCUMENTS

| | | |
|---|---|---|
| 1,276,267 | 8/1918 | Rasmussen et al. |
| 1,649,841 | 11/1927 | May . |
| 2,732,741 | 1/1956 | Müller-Strobel ............ 81/3.2 X |
| 3,364,556 | 1/1968 | Cocce et al. .................. 29/239 |
| 3,475,944 | 11/1969 | Marshner ....................... 72/347 |
| 3,618,429 | 11/1971 | Froeliger ................... 113/1 K X |
| 3,803,795 | 4/1974 | Ouellette ..................... 53/76 X |

Primary Examiner—Robert A. Dawson
Attorney, Agent, or Firm—Max L. Williamson

[57] ABSTRACT

A method and apparatus for removing a liner from a formed metal closure by at least partially everting the closure with an advancing punch adapted to temporarily couple the everted closure. By everting the closure, the liner becomes accessible to be retained within the closure support and is separated from the closure when the punch is retracted. A stripper is provided adjacent the punch to separate the everted metal portion of the closure from the punch.

10 Claims, 4 Drawing Figures

METHOD AND APPARATUS FOR EVERTING A CLOSURE AND SEPARATING A LINER THEREFROM

BACKGROUND OF THE INVENTION

This invention relates to a method and apparatus for removing liners from metal closures.

Metal closures having plastic liners contained therein have become increasingly popular for sealing and containing a product in a container, particularly soft drinks and beer. Typically, the closure is made of aluminum and is adapted to threadably engage with a bottle. The liner, typically, is made of a plastic material such as polyvinyl chloride or ethylene vinyl acetate.

In the manufacture of such closures a certain amount of closures are manufactured that are defective for one reason or another and thus become scrap. With the relatively recent emphasis on recycling of aluminum scrap, these defective closures have become a potentially valuable source for recoverable and recyclable aluminum scrap.

An even greater potential source for recoverable and recyclable aluminum scrap is the used closure removed from the bottle by the consumer. In order to reduce litter, a number of states have enacted legislation which requires a deposit on the container at the time of purchase whether the container is reusable or not. At least one state has carried this concept further by requiring that the closure be returned with the container for refund of the deposit. Even in those states that do not require return of the closure, it has been observed that many consumers return the closure with the empty container.

Typically, the liner is firmly affixed to the closure by an adhesive or by partially melting a portion of the liner adjacent the end wall of the closure, thus making it difficult to remove the liner. This has a severe adverse effect upon the value of the closure as recyclable scrap because the weight of the liner is approximately 33% of the total weight of the closure and thus it creates a substantial contamination problem when remelting the combination. The difference in value in today's scrap market, for example, is approximately $0.18/# for closures having the liners contained therein as opposed to approximately $0.48/# if the liners were removed.

Since a goodly number of containers are now being returned by the consumer to recover a deposit and since many of those containers are returned with the used closure attached thereto, the closure must be removed if the container is of a reusable variety. A wide variety of devices have been developed to remove closures from bottles, such as U.S. Pat. No. 3,803,795, for example, but because of the relatively low scrap value of a closure having a liner contained therein, the closures are often simply discarded.

Heretofore attempts have been made to remove the liners by burning or dissolving them in a chemical solvent to take advantage of the enhanced scrap value, but such methods have not been practically or commercially feasible. As a consequence, bottlers or others concerned with disposing of the scrap closures have not been economically motivated to introduce the scrap closures into the recyclable metal stream, and a potentially valuable asset is being lost.

It is desirable, therefore, to provide a method and apparatus for economically removing a plastic liner from a scrap metal closure to enhance the value of the closure and encourage the recovery of a valuable recyclable metal asset.

BRIEF DESCRIPTION OF THE INVENTION

It is an object of this invention to provide a method and apparatus for removing a liner from a metal closure.

In accordance with this invention, a closure having a liner therein is supported upon a tubular member having an inwardly projecting annular lip adjacent the top edge. A punch having an annular recess portion near its lower end is disposed above and coaxially with the tubular member and closure. Advancing the punch downward against the end wall of the closure causes the end wall and liner to distort and draw the skirt wall into the tube. As the punch advances, the partially everted closure wraps around the end of the punch and grips the punch in the recess portion. Eversion of the closure causes the liner to become exposed and the punch is advanced until the liner clears the annular lip projecting into the tube. Reversal of the punch causes a peripheral portion of the liner edge to contact the tube lip and restrains the liner from further upward movement. With the liner thus restrained, the closure engaged with the ascending punch separates therefrom. The closure is stripped from the punch by withdrawing the punch into a stripper sleeve surrounding the punch.

This and other objects and advantages will become more apparent from the description and examination of appended drawings in conjunction therewith of a preferred embodiment of the present invention.

DESCRIPTION OF A PREFERRED EMBODIMENT OF THE INVENTION

Figure 1:
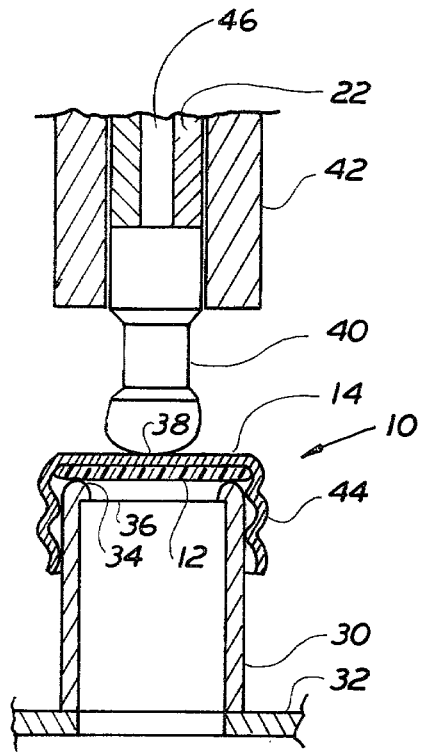
FIG. 1 is an elevation view and partial cross section of an embodiment of this invention, showing a closure having a liner contained therein positioned for the beginning of the delining cycle.

Apparatus for removing a liner from a closure in accordance with this invention is shown in FIGS. 1, 2, 3 and 4. The apparatus is also disclosed in a U.S. patent application Ser. No. 144,342 entitled "Method and Apparatus for Removing Liners from Metal Closures" filed by E. E. Rumberger et al. concurrently herewith. A hollow cylindrical tube 30 is vertically supported on a platform 32. The tube has a curved top edge 34 and an inwardly projecting annular lip 36 adjacent the top edge 34. An elongate cylindrical punch 22 is coaxially aligned with the tube 30 and is adapted for axial reciprocal motion. The punch 22 is provided with a convex end surface 38 and an annular recess 40 adjacent the curved end 38. A hollow cylindrical stripper 42 is coaxially aligned with the punch 22, and the punch 22 is at least partially contained within the center bore of the stripper 42. Sufficient clearance between the punch 22 and the inner surface of the stripper 42 is provided for reciprocal motion of the punch 22 in relation thereto.

At the beginning of the delining cycle, a closure 10 is positioned on the tube 30 with the end wall 14 and liner 12 affixed thereto supported by the curved upper edge 34 of the tube 30 and the depending skirt wall 44 of the closure 10 loosely surrounding the tube 30.

Advancing the punch 22 downward against the end wall 14 causes the end wall 14 and liner 12 to distort and draw the skirt wall 44 of the closure 10 over the curved top edge 34 of tube 30. As advancement of the punch 22 continues, wall portions of the closure wrap around the end of the punch 22 and partially grip at least a portion of the reduced diameter punch in the recess 40 and thus temporarily couple the closure with the punch.

Figure 2:
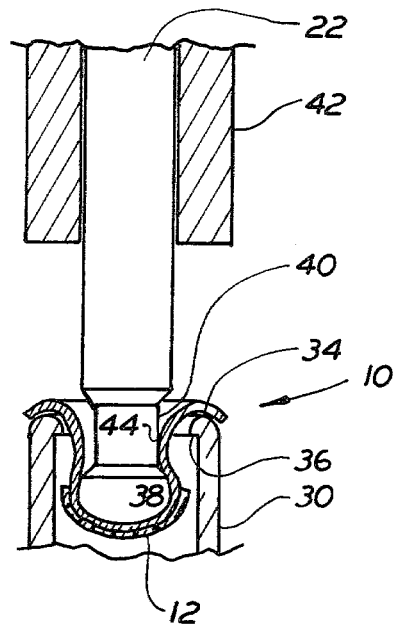
FIG. 2 is a partial view of the elements shown in FIG. 1 with the closure partially everted and the liner accessible for separation from the closure.

As shown in FIG. 2, the punch 22 having the closure 10 coupled therewith has advanced a distance at least sufficient for the edge of the liner 12 to clear the inwardly extending lip 36 of the tube 30.

Figure 3:
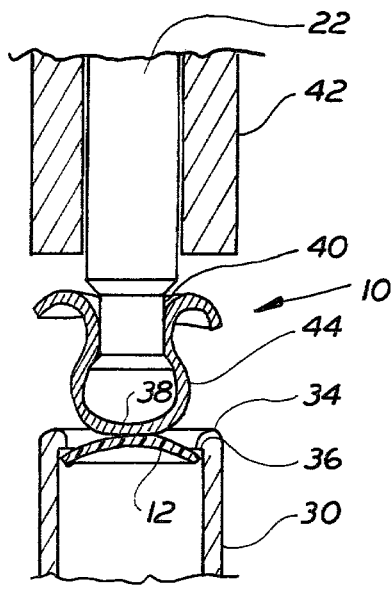
FIG. 3 is a partial view of the elements shown in FIG. 1 with the liner restrained for separation.

The motion of the punch 22 is then reversed, and as the punch 22 is withdrawn from the tube 30, an edge portion of the liner 12 contacts the tube lip 36 and restrains it from being withdrawn from the tube 30, as shown in FIG. 3.

If desirable, a heating element 46 extending axially the length of the punch 22 may be included to melt at least a portion of the liner 12 at the interface of the liner and the closure. The punch 22 is preferably provided with a convex end surface 38 if a heating element 46 is utilized to insure intimate contact between the closure and the punch for adequate heat transfer. This may be desirable to reduce the bond between the liner and closure and thus insure separation. An alternate method of improving the liner separation capabilities of the present invention is to create a partial vacuum within the tube 30 which would provide an additional pulling force on the liner 12 as the edge of the liner seals against the lip 36.

Figure 4:
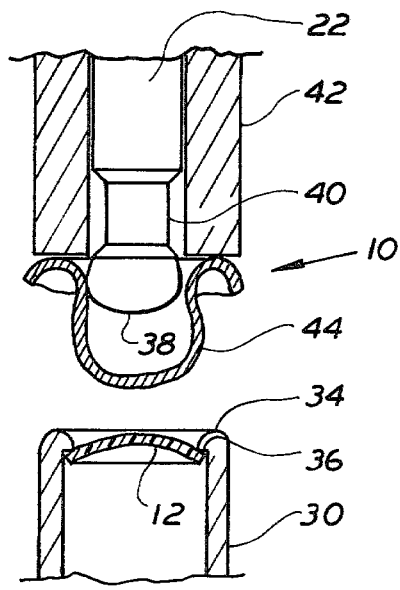
FIG. 4 is a partial view of the elements shown in FIG. 1 with the liner separated and the closure at the point of being stripped from the punch.

In the view shown in FIG. 4, the liner 12 has been separated from the closure 10 because of the restraint provided by the tube lip 36, and the punch 22 with the closure 10 coupled therewith has been withdrawn free of the tube 30. The punch 22 has been withdrawn a distance sufficient to cause the stripper 42 to contact the closure 10 which is shown at the point of detachment with the punch 22. It is apparent that further withdrawal of the punch 22 will cause the closure 10 to be stripped from the punch 22 and fall free for collection.

In a modification of the present invention, a bottle may serve as the closure support. A bottle having a closure thereon is positioned and restrained from movement below a punch. Downward motion of the punch, pressing against the end wall of the closure, causes the closure to become temporarily coupled with the punch while everting the closure and stripping it from the bottle threads as the closure is drawn into the bottle. Eversion of the closure causes the liner to become exposed and since the liner is larger in diameter than the inside diameter of the bottle, the liner becomes at least partially restrained from vertical movement by the peripheral edge of the liner bearing against the bottle. In those instances where the liner is not attached to the closure, it may be seen that this restraint is sufficient to retain the liner within the bottle when the punch is withdrawn, and the metal cap portion can then be stripped from the punch. If the liner is attached to the closure and does not separate from the closure due to interaction with the bottle, it may be separated by mechanical means such as a rotating wire brush or chisel after the punch is withdrawn from the bottle.

Thus, it can be seen that the present invention provides a novel and economical method of removing a plastic liner from a metal closure which encourages recovery of a valuable asset that is now being lost as waste.

What is claimed is:

1. A method for separating a liner from a metal closure having a cylindrical skirt and a top end wall having an exterior surface and an interior surface against which a liner is disposed, comprising:
   supporting the closure;
   pressing against the exterior surface of the top end wall with pressing means to at least partially evert the closure;
   reforming the everted closure against the pressing means to temporarily couple the closure with the pressing means;
   retaining the liner in support means;
   separating the liner from the closure; and
   stripping the partially everted closure from the pressing means.

2. A method as described in claim 1 which includes at least partially melting the liner at the interface between the liner and the closure.

3. Apparatus for separating a liner from a metal closure having a cylindrical skirt and a top end wall having an exterior surface and an interior surface against which a liner is disposed, comprising:
   a closure support means having an opening therein and a liner retaining means within the opening;
   a pressing means disposed above and coaxially aligned with the opening in said support means having a closure thereon, said pressing means adapted for temporarily coupling with the closure while at least partially everting the closure supported on said support means; and
   a stripping means adjacent said pressing means for stripping the everted closure from said pressing means after the liner is separated from the closure.

4. Apparatus as described in claim 3 which includes heating means for at least softening a portion of the liner at the interface between the liner and the closure.

5. Apparatus as described in claim 3 wherein said support means is a cylindrical tube.

6. Apparatus as described in claim 5 wherein said retaining means is an inwardly projecting annular lip on the interior of said tube adjacent an upper end of said tube.

7. Apparatus as described in claim 3 wherein said pressing means is a punch.

8. Apparatus as described in claim 3 wherein said stripping means is a sleeve surrounding said pressing means.

9. Apparatus as described in claim 7 wherein an end of said punch has a convex surface.

10. Apparatus as described in claim 7 wherein said punch is provided with an annular recess for the purpose of temporarily coupling an at least partially everted closure with said punch.

* * * * *